(12) United States Patent
Astruc

(10) Patent No.: US 7,558,652 B2
(45) Date of Patent: Jul. 7, 2009

(54) ON-BOARD SYSTEM FOR CONSTRUCTING AN AIRCRAFT TRACK

(75) Inventor: Joël Astruc, Puyricard (FR)

(73) Assignee: Eurocopter, Marignane (FR)

( * ) Notice: Subject to any disclaimer, the term of this patent is extended or adjusted under 35 U.S.C. 154(b) by 644 days.

(21) Appl. No.: 11/236,584

(22) Filed: Sep. 28, 2005

(65) Prior Publication Data

US 2006/0069468 A1 Mar. 30, 2006

(30) Foreign Application Priority Data

Sep. 28, 2004 (FR) .................................. 04 10276

(51) Int. Cl.
*G01C 21/00* (2006.01)
(52) U.S. Cl. ................ 701/3; 701/4; 701/301; 342/29; 342/455
(58) Field of Classification Search ................ 701/301, 701/213, 200; 340/961; 342/29, 455
See application file for complete search history.

(56) References Cited

U.S. PATENT DOCUMENTS

| | | | |
|---|---|---|---|
| 6,088,654 A * | 7/2000 | Lepere et al. | 701/301 |
| 6,314,370 B1 * | 11/2001 | Curtright | 701/213 |
| 6,675,095 B1 | 1/2004 | Bird et al. | |
| 2003/0107499 A1 | 6/2003 | Lepere et al. | |
| 2004/0059473 A1 | 3/2004 | He | |

FOREIGN PATENT DOCUMENTS

EP 0 750 238 12/1996

\* cited by examiner

*Primary Examiner*—Tuan C To
*Assistant Examiner*—Redhwan Mawari
(74) *Attorney, Agent, or Firm*—Young & Thompson

(57) ABSTRACT

A system (20) on board or suitable for use on board an aircraft to define an aircraft track having a plurality of segments, the system includes a display unit (10) arranged to display an image (11) containing a representation of the footprint of a segment (S, S1, S2) in a plane or level; an analog input member (17) for inputting altitude data (A) into a computer (13) connected to the display unit; and a calculation program or module arranged to determine a representation (C1, C2, PR1, PR2) of relief that is dangerous for a flight altitude equal to the value of the altitude data (A), and to superimpose (or include) the representation on (in) the image (11).

18 Claims, 3 Drawing Sheets

ON-BOARD SYSTEM FOR CONSTRUCTING AN AIRCRAFT TRACK

FIELD OF THE INVENTION

The present invention relates to an on-board system or a system suitable for being mounted on board an aircraft, for providing assistance in piloting the aircraft, in particular a rotary wing aircraft, by constructing a safe track (road) to be followed by an aircraft.

The technical field of the invention is that of manufacturing piloting systems for use on board a helicopter.

An object of the invention is to provide the aircraft pilot with means for quickly defining a track that is safe relative to relief.

In particular, a system of the invention must be usable in flight so as to enable a pilot undertaking specific missions of the emergency medical service (EMS) type, to act while in flight to construct a future portion of the track. To be able to do this, the invention must be fast in use and must give the pilot complete perception of the track that is being constructed.

An object of the invention is to enable segments of a track (road) to be defined in a flight plan in a manner that is suitable for use both for flights under visual meteorological conditions (VMC), where the pilot can see whether conditions are safe relative to relief, and for flights under instrument meteorological conditions (IMC) in which the pilot cannot see the ground and where safety in flight is ensured by accurately following a track that has previously been determined as safe by making use of terrain databases.

Known navigation computers are suitable for programming and following a track made up of a succession of segments defined in three dimensions.

They are implemented mainly with the help of specific terminals known as control and display units, comprising a keyboard and a screen enabling alphanumeric characters to be input and displayed and enabling commands to be launched from pages of commands.

They are sometimes associated with pointer devices enabling a cursor to be positioned on a map display device.

In order to construct a safe flight plan, a pilot can make use of aeronautical charts on which relief appears, and by applying overflight margins the pilot can deduce therefrom waypoints and flight altitudes that can subsequently be input blind. The safety provided by that technique is poor since it is tied both to the quality with which points and segments are input, and also to the quality of the use that is made of aeronautical charts.

Efforts have been made to develop systems for assisting the piloting of an aircraft that incorporate calculating interference between a terrain model and segments of an aircraft track in order to warn of collisions with the ground.

Patents FR 2 697 796 and U.S. Pat. No. 5,414,631 describe a collision avoidance system including means for calculating an aerial floor vertically below the aircraft; those calculation means are connected to means for locating the aircraft and to a database of safe altitudes; predictor means deliver a predicted aircraft situation, and an alarm is triggered when said predicted situation comes below the floor.

Patents FR 2 789 771 and U.S. Pat. No. 6,424,889 describe a system for calculating a horizontal path for avoiding danger zones between two waypoints, complying with constraints relating to approach direction, track or heading, and radii of turn. A mass memory in the system contains in particular:

i) cartographic data suitable for enabling a computer to display the image of a map of the zone being overflown during a mission;

ii) data defining the intended path, enabling the computer to display said path superimposed on the image of the map; and iii) data relating to danger zones, if any, that are to be avoided.

It is stated that the data can be modified by the pilot, even though no means are provided for that purpose.

Patent applications FR 2 813 963 and US 2003 107 499 describe an airborne device for providing assistance in aerial navigation. The device includes a display model for displaying a two-dimensional representation of the relief over a displayed area; and during landing or takeoff, the issuing of warnings is selectively inhibited over portions of the displayed area that are close to the predicted path of the aircraft.

U.S. Pat. No. 6,421,603 describes another system for detecting interference between each segment of a flight plan and a digital terrain model; each segment is associated with a tube having at least one dimension that can be specified independently of the dimensions of tubes corresponding to the other segments; the terrain model presents a structure that is hierarchical; an alarm is triggered when interference is detected with the ground or with an airplane.

At present, there does not exist any system on board an aircraft that enable a member of the crew of the aircraft to define and/or modify a safe flight plan in interactive manner.

The invention satisfies this need.

SUMMARY OF THE INVENTION

An object of the invention is to propose an on-board system, or a system suitable for use on board an aircraft, making it possible, interactively, to construct an aircraft track that is safe, in particular relative to the ground.

An object of the invention is to propose such methods and systems that are improved and/or that remedy at least in part the methods and systems known in the prior art for providing assistance in piloting.

In one of its aspects, the invention provides a system comprising display means for displaying a representation (generally a plan view) of relief extending substantially above an altitude, together with a representation (generally in the same plane) of the footprint of a segment of an aircraft track (or flight plan) that is being defined or modified; the system further comprises analog input means for inputting altitude data into a computer connected to the display means, and a module for calculating the representation of the relief as a function of said altitude data.

The invention makes it possible to vary in real time the representation of obstructing relief that might interfere with a track segment of determined position, altitude, and footprint (i.e., the projection representation of the footprint of a segment with positioning errors and margins, in a vertical section and/or a horizontal view).

In another aspect of the invention, a system for providing assistance in defining a safe track is proposed that comprises:
 a digital terrain model;
 a display screen;
 an analog member for inputting altitude data of a segment of a track that is to be defined or modified;
 a computer including means for determining one or more zones of the terrain model that are close to said segment and that are of an altitude that is substantially higher than said altitude data; and
 means for causing said zone(s) as determined in this way to be displayed on the screen.

In another aspect, the invention provides an on-board system or a system suitable for being used on board an aircraft, for defining an aircraft track made up of a plurality of segments, the system comprising:

>   display means arranged to display an image containing a representation of the footprint of a segment on a plane or level;
>
>   analog means for inputting altitude data into a computer connected to the display means; and
>
>   a calculation module or program arranged to determine a representation of relief that is dangerous for flight at an altitude equal to the altitude data, and arranged to superimpose (overlay or include) said representation on (in) the image.

The term "analog" member for inputting data, is used to designate any type of member that can be actuated manually by a pilot such as a slider, a track-ball, a knob, a scroll-wheel, or a joystick, and also including a stimulated version thereof on a computer screen (e.g. a touch-sensitive screen), including scroll windows, and enabling a representative magnitude to be caused to vary in continuous manner.

The term "analog" is used in respect of a member or means essentially to exclude keyboards or keypads—and simulations thereof on a screen—suitable for inputting a data value sequentially in digital form.

Preferably, the analog input means—or analog input member—is/are used not only for inputting the altitude of a segment that is being defined or modified, but also for inputting at least two other coordinates or parameters relating to the segment—such as the latitude and longitude of at least one point of the segment.

To this end, the system includes a positioning member—preferably a joystick—having three independent dimensions or movement components; alternatively, a track-ball is used that is suitable for inputting and/or modifying two dimensions or coordinates simultaneously—such as the latitude and the longitude of a waypoint (of the segment that is to be defined)—, together with a second analog member such as a scroll-wheel for substantially simultaneously inputting into the computer a third dimension or coordinate, such as the altitude of the segment.

An optionally simulated button or switch enables one or more data values corresponding to the position of the analog member(s) to be confirmed.

By superimposing a segment and its footprint on the screen together with the relief that emerges at the altitude of the segment and lies in the proximity of the segment, the invention enables the operator to manipulate the data input member so as to be able to see the risks of interference between said footprint and said relief; the invention thus enables the operator to relocate the altitude and/or the position or direction of the segment, which can be done substantially instantaneously by using the analog means or member for inputting data.

The invention thus allows the operator to construct a track that is safe relative to the relief in the zone being overflown in a manner that is "manual", interactive, and visual.

The footprint (or the area of a strip overlapping the segment) presents a width that is determined as a function of a (horizontal) avoidance margin allowing for possible error in the positioning of the aircraft and possible error in the terrain model in a horizontal plane or at a constant altitude level.

The outline and the extent of each danger zone of relief "emerging" above the level corresponding to the altitude of a segment are determined as a function of a (vertical) overflight margin, a possible error in the positioning of the aircraft in a vertical plane, and a possible error in the altitude of elevation data in the terrain database.

Thus, in another aspect of the invention, the track is defined using a pointer device that makes use of integrated controls for interactively positioning in three dimensions (x, y, and z) on a map-display screen the succession of waypoints and of segments defining a track.

The system interactively displays those zones that are dangerous for the element that is being defined. The pilot determines visually that the track is safe by positioning the track elements in zones that are safe with respect to their characteristics. This enables the pilot to construct a track that is safe without needing to perform iterations.

These track elements are defined using terrain elevation data in an on-board database covering the zone in which the mission is taking place.

The safety device makes it easy to take account of overflight and avoidance margins associated with the track that is being defined, and also of horizontal and vertical positioning errors, where such errors can be given predetermined constant values.

In a variant, these elements may be calculated as a function of the quality of the information provided by the sensors used, for example use of a satellite positioning system, compared with a positioning system making use of radio navigation beacons (VOR, DME, . . . ).

Similarly, the margins may be constant during a flight; alternatively, they may have values that differ depending on the stage of flight: being large during cruising and narrow during a final approach stage.

In preferred embodiments of the invention:

>   the system includes a module for extracting cartographic data from a cartographic database and for integrating said data in the image;
>
>   the system includes means for determining at least one first contour line (C1) of dangerous relief, and at least one second contour line (C2) of dangerous relief surrounding at least the first contour line, on the basis of a vertical positioning error (EPV) and of an overflight margin (MS);
>
>   the image zones defined by the contour lines (C1) and (C2) are of different colors and/or textures;
>
>   the representation of the footprint of a segment comprises a strip corresponding to a horizontal positioning error (EPH) and a strip corresponding to an avoidance margin (MC); and
>
>   the image includes a representation of two successive segments (S1, S2) of a track, and dangerous relief crossed by the bisector (BI) of the angle formed between the axes of the two segments is represented by open contour lines (C11, C21, C12, C22) and by the bisector.

The invention enables the pilot to construct and to make safe a track without performing successive iterations: the pilot can define and position track segments in safe zones at the first attempt.

The device described enables the pilot to see clearly the track that is being defined together with the surrounding relief; this enables the pilot to have full control over defining the track.

The system also serves to show up the notions of overflight margin and of avoidance margins.

The system of the invention for detecting interference with relief is not based on complex algorithms for calculating interference, but of merely displaying a horizontal section superimposed on the displayed geographical environment.

The invention can be used independently of any other system for constructing a safe track without performing successive iterations.

It may also be associated with a system for calculating interference, such as the systems described in the above-mentioned patents; the invention then makes it possible to avoid the stage involving successive iterations that are needed to find a safe track, and/or enables the number of such iterations to be reduced.

BRIEF DESCRIPTION OF THE DRAWINGS

Other characteristics and advantages of the invention appear from the following description which refers to the accompanying drawings and which relates to preferred embodiments of the invention without being limiting in any way.

DETAILED DESCRIPTION OF THE INVENTION

Figure 1:
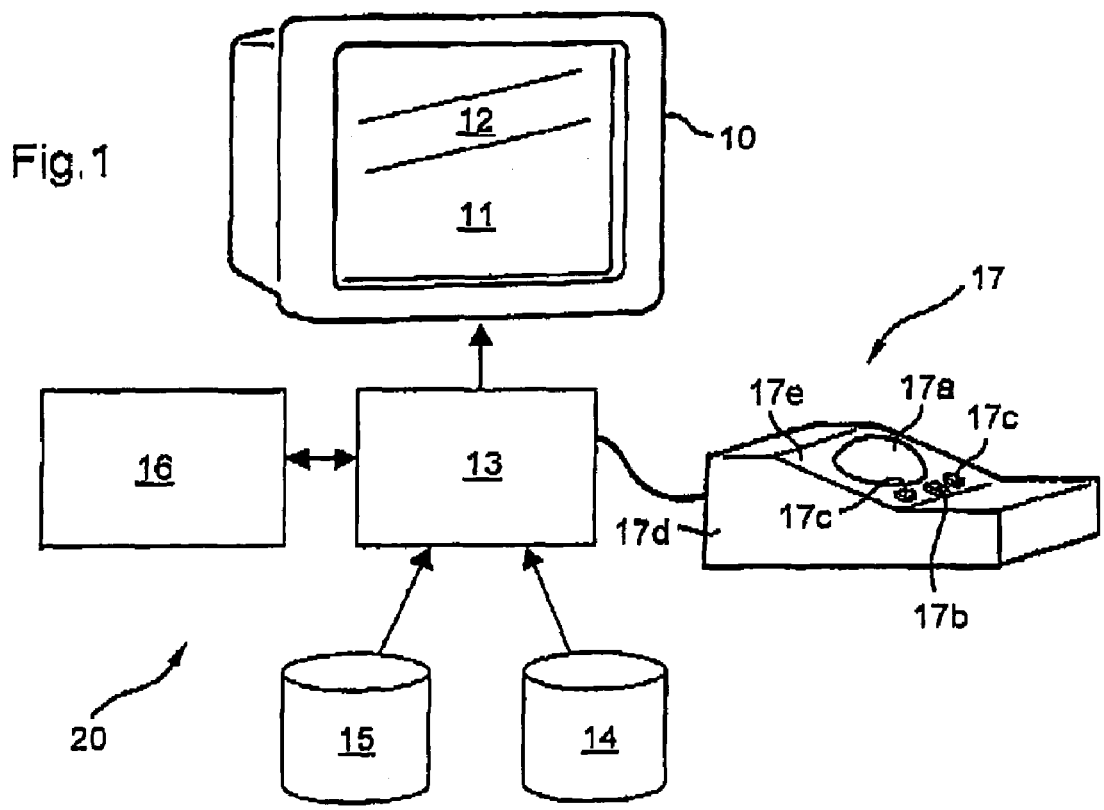
FIG. 1 is a block diagram showing the main components of a system of the invention.

The device shown in FIG. 1 is made up of the following elements:
- a display screen 10 displaying a map 11 of the working area, the track 12 that is being modified, made up of a succession of rectilinear segments, and the symbology representing the dangerous areas;
- a map-drawing computer 13 generating map images on the basis of the cartographic database 14 and generating the view of dangerous areas on the basis of the digital terrain model 15;
- a cartographic database 14 containing a digital description of the geographical environment of the working area;
- a digital terrain model 15 containing the digital description of the hypsometric environment of the working area;
- a navigation computer 16 for managing and storing tracks and objects describing them; and
- a pointer 17 enabling tracks and the objects describing them to be manipulated interactively. It enables the position (x, y) and the altitude (z) of an object on the map to be varied simultaneously.

The pointer 17 comprises a housing 17d having a face 17e from which there project a track-ball 17a, a scroll-wheel 17b, and two buttons 17c.

While a segment is being created or modified, the device presents a map of the area that includes the segment and superimposes thereon those geographical areas that are of altitude that is dangerous for the segment(s) under modification. Textures are superposed on the map as calculated for the entire area of the display screen so as to appear above the map, but without masking it. These textures are referred to below as "emerging ground" or areas of dangerous relief. The pilot thus sees areas (danger zones) appearing in real time on the screen 10 that are inaccessible or dangerous for the segments that the pilot is defining. This makes it possible to avoid these zones and to position the segment in a zone that is safe or else to change the altitude of the segment so as to reduce the size of the emerging ground.

Track segments are defined, introduced, modified, and/or manipulated using the pointer which serves to vary three axes, parameters, or coordinates simultaneously (e.g. a joystick+a scroll-wheel, a track-ball+a scroll-wheel); the pilot modifies the position and the altitude of the current segment in real time. Since the emerging ground is calculated and displayed in real time, the pilot can easily update the segment interactively and see the consequences of a change in the altitude of a point or segment on the position and the extent of the emerging ground for the altitude under consideration.

A track segment is made safe by applying overflight and avoidance margins relative to the terrain.

Figure 2:
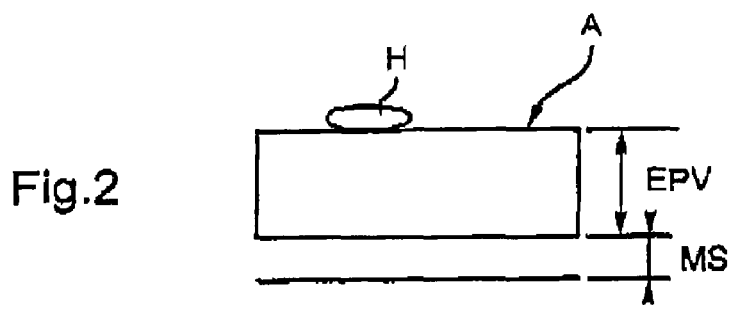
FIG. 2 is a diagram showing how vertical positioning error and overflight margin are defined for being taken into account when calculating the contour lines of relief that is dangerous at a given altitude.
Figure 3:
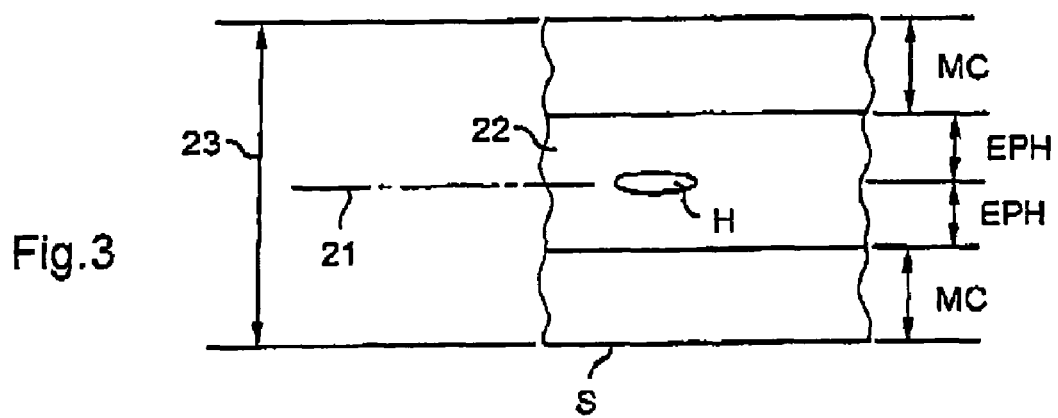
FIG. 3 is a diagram showing how a horizontal positioning error and an avoidance margin are defined in order to determine the width of the footprint of a segment of a flight plan.

These margins can be represented by a volume surrounding the helicopter or the track segment as defined in FIGS. 2 and 3; distinctions can be drawn between a vertical position error, a horizontal position error, an overflight margin, and an avoidance margin.

With reference to FIG. 2, the vertical positioning error EPV corresponds to a depth extending down from the altitude level A of the flight segment under consideration for the helicopter H; the overflight margin MS corresponds to a minimum height for overflying an obstacle (ground or relief) and is added to the error EPV.

In similar manner (cf. FIG. 3), the horizontal positioning error EPH corresponds to half the width of a first strip 22 having parallel edges and extending along the axis 21 of the segment under consideration; the avoidance margin MC corresponds to the width of an additional strip extending on either side of the first strip, such that the total width 23 of the footprint of the segment (along its axis 21) corresponds to a total comprising twice EPH plus twice MC, thereby defining a safety corridor.

Figure 4:
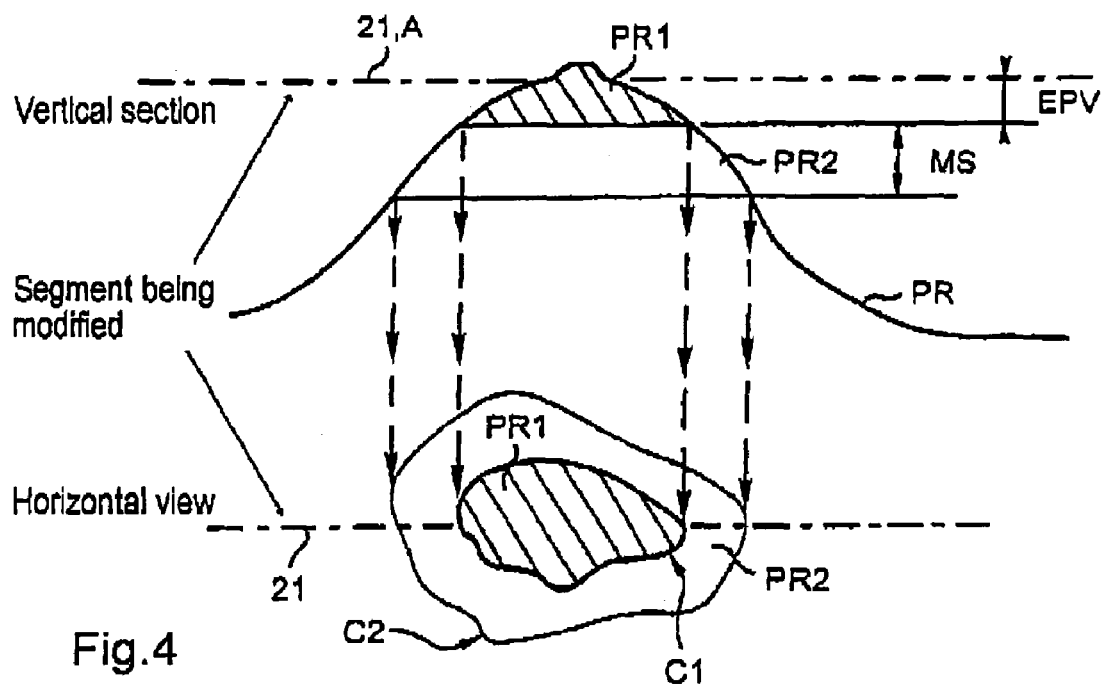
FIG. 4 is a diagram in section view showing some of the terrain data and showing how high portions of the corresponding relief that are dangerous for a segment of given altitude are determined, account being taken of a vertical margin and possible vertical error, and also showing said portions of dangerous relief projected onto a horizontal plane or level situated at the altitude under consideration.

The overflight margin and the vertical positioning error are taken into account when calculating the vertical sections and horizontal views that represent emerging ground relative to the altitude of the segment being created and/or modified, as shown in FIG. 4.

The segment under consideration and its longitudinal axis 21 extend in a plane or altitude level A which intersects the summit of a portion of relief PR extracted from the terrain database 15.

The projection onto a horizontal view or plane of the culminating portion PR1 of the relief PR that extends between the altitude A and the altitude A minus the vertical error EPV, and which is shown with a texture or a color that contrasts with the background, extends in the plan view—at the bottom portion of the figure—within a closed contour line C1 that intersects the axis 21.

In the same manner, the projection in a vertical section of the portion PR2 of the relief that extends between the altitude (A-EPV) and said altitude minus the overflight margin MS, extends in the plan view within a closed contour line C2 surrounding the contour line C1.

Figure 5:
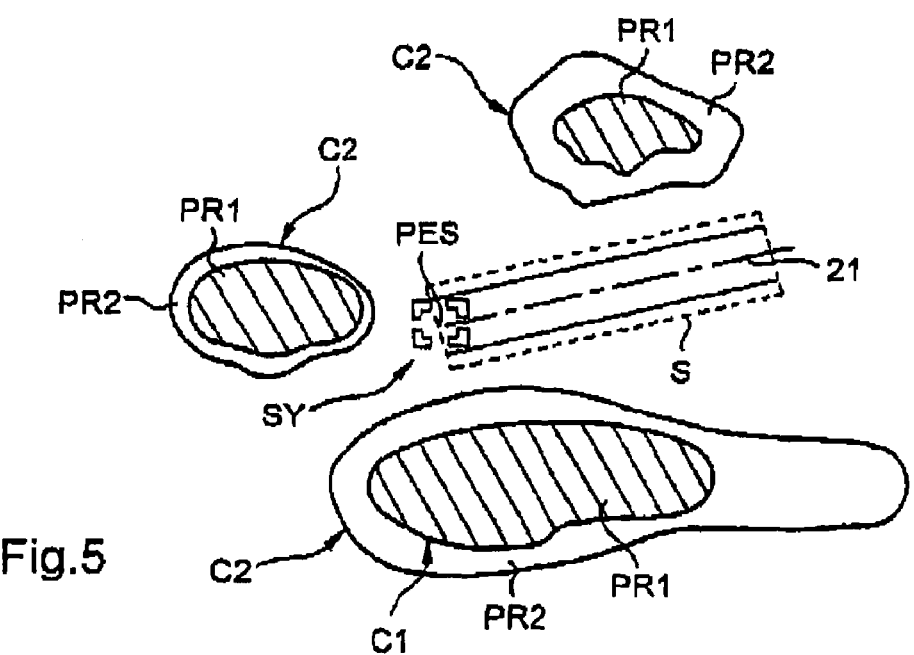
FIG. 5 is a plan view showing a track segment and its footprint while it is being created, together with the location and the extent of three areas of dangerous relief that extend in the proximity of the segment.

The areas defined by these contour lines C1 and C2 are areas that are dangerous or that constitute emerging ground in the meaning of the present application; in FIG. 5, three dangerous areas PR1, PR2 are to be found in the proximity of the segment S at the altitude under consideration.

A symbol SY comprising four identical right angles is superimposed on the end point PES of the segment S that is being modified and identifies the end of the segment under modification. By changing the altitude of this point and thus of the segment S that is associated therewith, by acting manually on the analog input member, a pilot or operator can extract areas of relief and cause the contour lines of their projections to be drawn so as to display the corresponding dangerous areas, thus seeing how these areas become larger or smaller and how they intersect the footprint of the segment, if at all.

Emerging ground is extracted over the entire area of the map shown on the screen.

The horizontal positioning errors and the avoidance margins are taken into account by attaching the safety corridor (23) to the segment that is being defined: a first corridor or central strip represents the positioning error EPH of the segment; while a second corridor or strip represented by a dashed line identifies the avoidance margin MC. The objective for the pilot varying the position of the point PES is to avoid interference between the safety corridor (23) and the dangerous areas. This guarantees leaving sufficient height and distance relative to the obstacles. Safety is determined purely visually by the pilot using the display of emerging ground.

When a single segment is modified, while creating a track, inserting a segment, deleting a point, or changing an altitude, the areas that are inaccessible or dangerous are defined relative to the altitude of the segment.

When two segments are concerned and are at different altitudes (as occurs when changing the position of a waypoint which modifies the preceding segment and the following segment), the areas that are inaccessible or dangerous are defined in part relative to the altitude of the preceding segment and in part relative to the altitude of the following segment. Emerging ground is extracted over the entire area of the map shown on the screen. The area associated with the preceding segment and the area associated with the following segment are separated by the bisector between the two segments and passing through the waypoint that is being modified.

Figure 6:
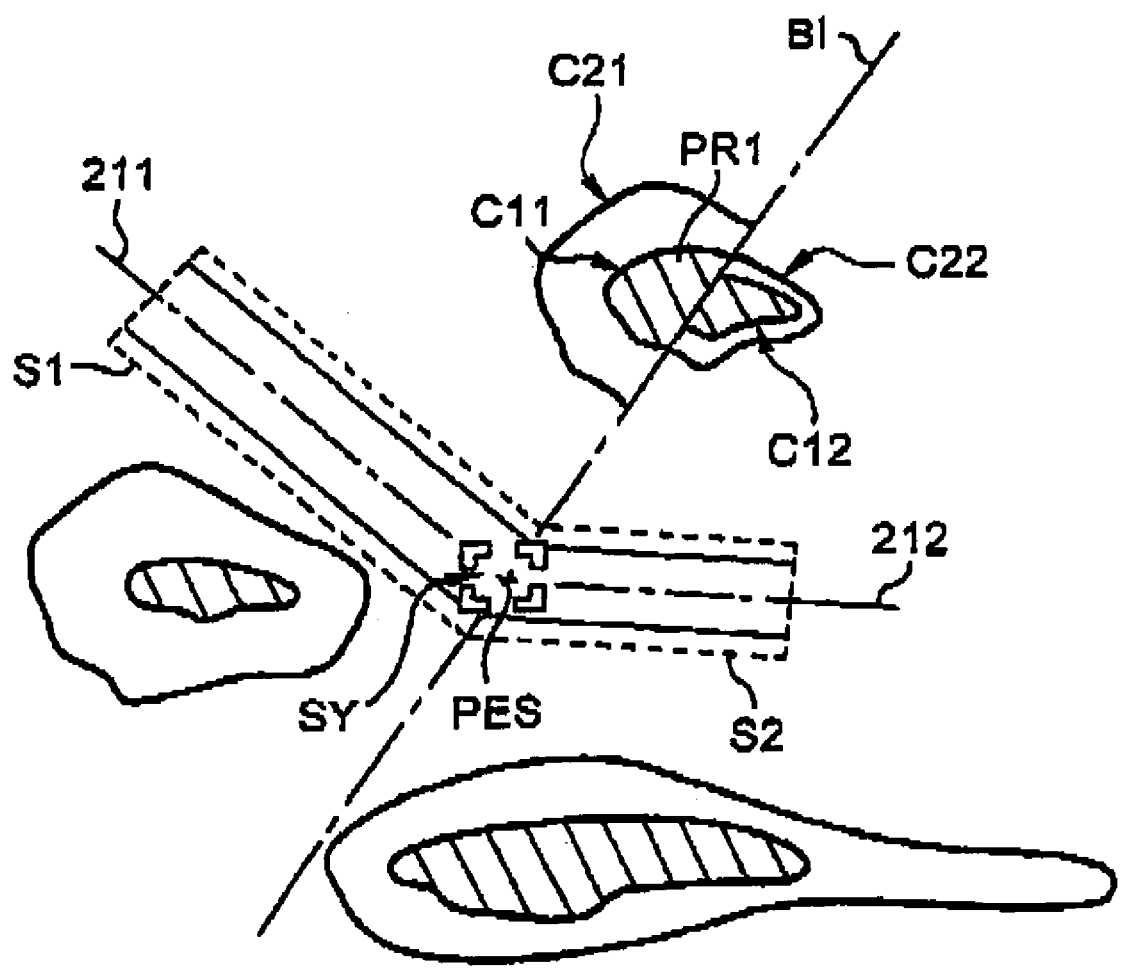
FIG. 6 is a plan view similar to FIG. 5 showing two successive segments of an aircraft track that is being modified, which segments are not in alignment and are not situated at the same level.

In the configuration shown in FIG. 6, the track comprises two rectilinear segments S1 and S2 which, in plan view, meet at a waypoint PES surrounded by the symbol SY.

The altitude of the segment S1 is lower than that of the segment S2; their respective axes 211 and 212 form an angle having a bisector that is referenced BI.

The representation of a hill or dangerous relief intersected by the bisector BI comprises two portions:
a first portion lying on the same side of BI as the segment S1 is defined by said bisector and by open contour lines C11 and C21 which are determined as described above with reference to FIG. 4, for the altitude of the segment S1; and
a second portion which extends on the other side of BI, and is defined by said bisector and by open contour lines C12 and C22 which are determined as described above with reference to FIG. 4, for the altitude of the segment S2.

What is claimed is:

1. A system (20) enabling an operator to define or modify, in an interactive manner, an aircraft track comprising a plurality of segments, the system comprising:
   a display (10) arranged to display a footprint image (11) representing a footprint of at least one segment of plural successive segments (S, S1, S2) that comprise an aircraft track on a horizontal plane, the footprint image comprising i) a first strip corresponding to a horizontal positioning error (EPH) and ii) an adjoining second strip corresponding to an avoidance margin (MC) such that a total width of the footprint image corresponds to a total comprising twice the horizontal positioning error (EPH) plus twice the avoidance margin (MC);
   a computer (13) connected to the display;
   an analog input member (17) enabling an operator, interactively during flight, to input altitude data (A) for a part of the aircraft track into the computer; and
   a calculation program stored in a computer readable medium arranged to determine a relief representation (C1, C2, PR1, PR2) of at least one dangerous relief for a flight altitude equal to the input altitude data (A) and to superimpose said relief representation on the footprint image (11) displayed on the display, the relief representation of the at least one dangerous relief comprising i) a first zone defined by a first contour line (C1) located at a first altitude equal to the input altitude data (A) minus a vertical positioning error (EPV) and ii) a second zone defined by a second contour line (C2) surrounding the first zone, the second zone defined by the first altitude minus an avoidance margin (MC),
   wherein the operator, during flight, is enabled by use of the analog input member to interactively change the input altitude data (A) and the position and direction of the at least one segment to update the relief representation and the footprint image displayed on the display allowing operator to cause the first and second contour lines to be displayed larger and smaller and intersecting with the footprint image.

2. A system according to claim 1, wherein the analog input member enables two parameters of the part of the aircraft track to be input simultaneously, said two parameters including latitude and longitude.

3. A system according to claim 1, wherein the analog input member enables three parameters of the part of the aircraft track to be input simultaneously, said three parameters including latitude, altitude, and longitude.

4. A system according to claim 3, wherein the analog input member comprises
   i) a pointer member comprising one of i) a joystick, ii) a track-ball, and iii) a scroll-wheel, and
   ii) a confirmation member for confirming the data corresponding to the position of the pointer member.

5. A system according to claim 4, wherein the confirmation member is one of a simulated button and a simulated switch.

6. A system according to claim 1, further comprising:
   a module for extracting cartographic data from a cartographic database (14) and for integrating said data in the footprint image (11) and the relief representation.

7. A system according to claim 1, wherein the first and second zones are of different colors and/or textures.

8. A system according to claim 1, wherein the displayed footprint image includes a representation of two successive segments (S1, S2) of the aircraft track, the two segments having respective axes (211 and 212), and in which the representation of dangerous relief intersected by a bisector (BI) of an angle formed by said axes is defined by open contour lines (C11, C21, C12, C22) and by the bisector.

9. A system (20) on board a rotary wing aircraft and enabling an operator to define or modify interactively an aircraft track comprising a plurality of track segments, the system being characterized in that it comprises:
   a computer (13);
   a display (10) arranged to display an image containing a representation in a horizontal plane of at least one strip centered on a rotary wing aircraft track segment (S, S1, S2), the display being connected to the computer;

analog input member (17) arranged to enable the operator, during flight, to input altitude data (A) into the computer (13) for at least one point of the aircraft track segment, the analog input means being connected to the computer; and a calculation module co-operating with the computer to determine a relief representation (C1, C2, PR1, PR2) of relief that is dangerous for a flight altitude equal to the value of the altitude data (A), and to include said representation of dangerous relief in the displayed image (11).

10. A system according to claim 9, wherein the analog input member enables two coordinates of the track segment or the point to be input simultaneously.

11. A system according to claim 9, wherein the analog input member enables the latitude, the altitude, and the longitude of the track segment or the point to be input simultaneously.

12. A system according to claim 11, wherein the analog input member comprises a pointer member and a member for confirming data corresponding to the position of the pointer member.

13. A system according to claim 12, wherein the positioning and confirmation members are one of a simulated button and a simulated switch.

14. A system according to claim 9, further comprising:
a module for extracting cartographic data from a cartographic database (14) and a module for integrating cartographic data in the displayed image (11).

15. A system according to claim 9, wherein the calculation module includes means for determining at least a first contour line (C1) of dangerous relief and at least a second contour line (C2) of dangerous relief surrounding the first contour line, on the basis of a vertical positioning error (EPV) and of an overflight margin (MS).

16. A system according to claim 15, wherein the zones of the image (11) defined by the contour lines (C1 and C2) are of different colors or textures.

17. A system according to claim 9, wherein the strip centered on the track segment comprises a strip of width corresponding to a horizontal positioning error (EPH) together with an adjacent strip of width corresponding to an avoidance margin (MC).

18. A system according to claim 9, wherein the image includes a representation of two successive track segments (S1, S2) having respective axes (211 and 212), and in which the representation of dangerous relief intersected by the bisector (BI) of the angle formed by said axes is defined by open contour lines (C11, C21, C12, C22) and by the bisector.

* * * * *